(12) United States Patent
Höfer et al.

(10) Patent No.: US 12,451,783 B2
(45) Date of Patent: Oct. 21, 2025

(54) DIRECT-CURRENT ELECTRIC MOTOR AND USE THEREOF AS A DRIVE OF A LIFTGATE

(71) Applicant: STABILUS GMBH, Koblenz (DE)

(72) Inventors: Florian Höfer, Neuwied (DE); Marian Bochen, Eitelborn (DE); Axel Knopp, Eitelborn (DE)

(73) Assignee: STABILUS GMBH, Koblenz (DE)

( * ) Notice: Subject to any disclaimer, the term of this patent is extended or adjusted under 35 U.S.C. 154(b) by 142 days.

(21) Appl. No.: 18/035,335

(22) PCT Filed: Nov. 11, 2021

(86) PCT No.: PCT/EP2021/081407
§ 371 (c)(1),
(2) Date: May 4, 2023

(87) PCT Pub. No.: WO2022/101354
PCT Pub. Date: May 19, 2022

(65) Prior Publication Data
US 2024/0014723 A1      Jan. 11, 2024

(30) Foreign Application Priority Data

Nov. 13, 2020   (DE) ............... 10 2020 130 006.9

(51) Int. Cl.
*H02K 23/42* (2006.01)
*H02K 23/40* (2006.01)
(Continued)

(52) U.S. Cl.
CPC ............. *H02K 23/40* (2013.01); *H02K 26/00* (2013.01)

(58) Field of Classification Search
CPC ........ H02K 23/04; H02K 7/106; H02K 23/40; H02K 26/00; H02K 23/42; H02K 23/405; H02K 23/68; H02K 23/66
(Continued)

(56) References Cited

U.S. PATENT DOCUMENTS 3,215,875 A * 11/1965 Latta ................. H02K 7/106
                                                                310/154.29
3,970,980 A *  7/1976 Nelson .................. H01F 7/145
                                                                335/229

(Continued)

FOREIGN PATENT DOCUMENTS

DE         3 632 509 A1    4/1987
EP           3451509 A1    3/2019
(Continued)

OTHER PUBLICATIONS

International Search Report for PCT/EP2021/081407 mailed on Feb. 8, 2022.

*Primary Examiner* — Burton S Mullins
(74) *Attorney, Agent, or Firm* — Schmeiser, Olsen & Watts, LLP

(57) ABSTRACT

A DC electric motor for driving a tailgate of a vehicle is provided, the DC electric motor including a rotor and a stator, the rotor being rotatably supported about an axis of rotation, at least one of the rotor and the stator having a magnetic asymmetry for generating an asymmetric magnetic interaction between the rotor and the stator, wherein the rotor and the stator are configured to assume first positions and second positions relative to each other, wherein a higher holding torque acts between the rotor and the stator in one of the first positions than in one of the second positions due to the asymmetry.

7 Claims, 5 Drawing Sheets

(51) Int. Cl.
*H02K 23/68* (2006.01)
*H02K 26/00* (2006.01)

(58) Field of Classification Search
USPC ............ 188/164, 267; 220/211; 310/77, 269
See application file for complete search history.

(56) References Cited

U.S. PATENT DOCUMENTS

| | | | | |
|---|---|---|---|---|
| 4,280,072 | A * | 7/1981 | Gotou | H02K 29/03 |
| | | | | 310/67 R |
| 4,644,233 | A * | 2/1987 | Suzuki | H02K 29/08 |
| | | | | 310/68 R |
| 4,700,098 | A * | 10/1987 | Kawashima | H02K 21/22 |
| | | | | 310/156.45 |
| 4,704,567 | A * | 11/1987 | Suzuki | H02K 29/08 |
| | | | | 318/400.41 |
| 4,935,655 | A * | 6/1990 | Ebner | H02K 23/04 |
| | | | | 310/46 |
| 5,087,845 | A * | 2/1992 | Behrens | H02K 23/08 |
| | | | | 310/68 B |
| 5,095,238 | A * | 3/1992 | Suzuki | H02K 29/08 |
| | | | | 310/67 R |
| 5,107,159 | A * | 4/1992 | Kordik | H02K 1/146 |
| | | | | 318/400.29 |
| 5,327,035 | A * | 7/1994 | Sunaga | H02K 7/061 |
| | | | | 310/216.096 |
| 5,982,055 | A * | 11/1999 | Matsushita | H02K 1/24 |
| | | | | 310/40 MM |
| RE38,400 | E * | 1/2004 | Kowall | E05B 81/14 |
| | | | | 318/266 |
| 6,967,422 | B2 * | 11/2005 | Nelson | H02K 26/00 |
| | | | | 310/191 |
| 7,287,803 | B2 * | 10/2007 | Koneval | B62D 33/0273 |
| | | | | 296/57.1 |
| 7,345,440 | B2 * | 3/2008 | Wang | H02P 6/22 |
| | | | | 318/400.04 |
| 7,362,031 | B2 * | 4/2008 | Maita | H02K 23/405 |
| | | | | 310/216.011 |
| 7,695,043 | B2 * | 4/2010 | Zagoroff | B62D 33/03 |
| | | | | 296/57.1 |
| 7,977,905 | B1 * | 7/2011 | Gruzberg | H02P 6/18 |
| | | | | 318/459 |
| 8,242,643 | B2 * | 8/2012 | Takahashi | H02K 26/00 |
| | | | | 310/39 |
| 10,720,800 | B2 | 7/2020 | Kobayashi et al. | |
| 2006/0197478 | A1 | 9/2006 | Wang et al. | |
| 2008/0278015 | A1 * | 11/2008 | Reisinger | H02K 23/04 |
| | | | | 310/78 |
| 2011/0025156 | A1 * | 2/2011 | Groening | H02K 49/06 |
| | | | | 307/104 |
| 2011/0148239 | A1 | 6/2011 | Nakamura et al. | |
| 2012/0080968 | A1 * | 4/2012 | Knight | H02K 7/106 |
| | | | | 310/76 |
| 2012/0256514 | A1 | 10/2012 | Junak et al. | |

FOREIGN PATENT DOCUMENTS

| | | |
|---|---|---|
| GB | 2 294 161 A | 4/1996 |
| JP | 2003189573 A | 7/2003 |
| WO | 2013/150048 A2 | 10/2013 |

* cited by examiner

DIRECT-CURRENT ELECTRIC MOTOR AND USE THEREOF AS A DRIVE OF A LIFTGATE

CROSS-REFERENCE TO RELATED APPLICATIONS

This application claims priority to PCT Application No. PCT/EP2021/081407, having a filing date of Nov. 11, 2021, based on DE Application No. 10 2020 130 006.9, having a filing date of Nov. 13, 2020, the entire contents both of which are hereby incorporated by reference.

FIELD OF TECHNOLOGY

The following relates to a direct current (DC) electric motor for driving a tailgate of a vehicle, the direct current electric motor comprising a rotor and a stator, the rotor being rotatably mounted about an axis of rotation. The following further relates to a use of the DC electric motor as a drive of a tailgate of a vehicle.

BACKGROUND

Tailgates of vehicles may be equipped with motors that automatically raise and lower the tailgate. To ensure that the tailgate, when open, does not fall down again on its own, i.e., driven by its own weight force, the supports are often equipped with locking, holding or braking elements that counteract the weight force of the tailgate. Alternatively, the tailgate can be held in place by the motor braking force of the tailgate motor if it can apply sufficient force.

U.S. Pat. No. 10,720,800 B2 discloses a brushless motor with an external rotor. The stator core comprises circumferentially arranged pole pieces that extend to different extents in the direction of rotation. As a result, the proportion of the surfaces between the pole piece and the rotor pole changes depending on the respective pole piece of the stator.

GB 2 294 161 A describes a non-magnetic rotor for a DC electric motor with radially arranged magnetic elements. The magnetic properties of the magnetic elements depend on the material of the sections of the magnetic elements. By an appropriate choice, the magnetic properties of the elements and thus the behaviour of the rotor can thus be influenced. The motor can be used in particular as a stepper motor.

WO 2013/150 048 A2 concerns an electric motor with external rotor and improved starting behaviour, in which only the stator is asymmetrical in the circumferential direction. The asymmetry is realized by physically manipulating pole pieces of the stator.

From each of U.S. Pat. No. 2,006,197 478 A1, U.S. Pat. No. 2,011,148 239 A1 and U.S. Pat. No. 2,012,256 514 A1, a rotor-stator pair is known in which an asymmetric magnetic interaction is realized by an air gap between the rotor and the stator with alternating width.

DE 3 632 509 A1 discloses a DC motor with a rotor comprising a permanent magnet with magnetic poles alternately inserted at the circumference and a stator comprising pole parts arranged at equal angular intervals at the circumference. The projecting pole parts of the stator comprise circumferentially alternating wider and narrower pole piece parts which are partially separated or recessed.

SUMMARY

An aspect relates to a DC electric motor for a tailgate of a motor vehicle which has an increased holding torque which is sufficiently large to bear the weight force of the tailgate in an open state, in particular in any fully or partially open state, so that any locking, holding or braking elements in the motor can be dispensed with.

In a first aspect, embodiments of the invention relate to a DC electric motor for driving a tailgate of a vehicle, the DC electric motor comprising a rotor and a stator, the rotor being mounted for rotation relative to the stator about an axis of rotation. The rotor and/or the stator have at least one magnetic asymmetry means for generating an asymmetric magnetic interaction between the rotor and the stator. The rotor and the stator are configured to be able to assume first positions and second positions relative to each other, wherein a higher holding torque acts between the rotor and the stator in one of the first positions than in one of the second positions due to the asymmetry means.

A direct current electric motor, also called a direct current motor, commutator motor or commutator machine, is a machine that is operated with direct current. The DC electric motor comprises a stationary stator and a rotor mounted for rotation relative to the stator about an axis of rotation. The rotor may be mounted within the stator so that the stator is formed as a yoke in the shape of a hollow cylinder. Alternatively, the rotor can be configured around the stator as a so-called external rotor.

The stator generates a magnetic field (stator field) that acts on the rotor or parts of it. This generates a torque via the Lorenz force, which in turn sets the motor in motion. The speed of the motor can be controlled via the strength of the magnetic field. To reduce the movement of the rotor, the stator field is switched in such a way that the torque generated counteracts the rotary movement.

The holding torque is the torque required to set a rotor in motion from rest.

The first positions are the positions in which a particularly high holding torque acts between the rotor and the stator. This means that a higher force must act on the motor to start the rotor from rest when it is in one of the first positions. Depending on the number of magnets installed and the symmetry of the structure of the rotor or stator, the motor can have several of these first positions.

Furthermore, the holding torque in the first positions can also be configured as a locally maximum holding torque. This means that the holding torque in one of the first positions can be lower than the holding torque in another of the first positions. Mathematically expressed, the holding torque in the first positions forms local maxima depending on the angle of rotation of the rotor. The holding torque of a given position is directly dependent on the magnetic properties of the materials used in the rotor and/or stator and their physical design.

The second positions are the positions that are not one of the first positions. This means that the holding torque in the second positions is lower than in the adjacent first positions.

The holding torque is increased by equipping the rotor and/or the stator with an asymmetry means. The asymmetry means causes the rotor, which moves in the stator field, to interact with the stator field not homogeneously in all positions, but according to the asymmetry means particularly strongly in the first positions. Due to the asymmetry means, the rotor automatically tries to take one of the first positions. Only if the torque generated is greater than the holding torque does the rotor remain in motion.

Usually, electric motors are operated in such a way that the holding torque or torques in different positions are as low as possible so that the movement can be easily started or maintained. Motors with large holding torques have less smooth movement of the rotor. The larger the holding torque, the higher the power required to run the motor and the vibration and noise generated when the motor is running, as a rule.

Motors with low holding torque require a brake or any form of holding force-generating holding means for locking. Only when the holding means is released is the movement of the rotor and thus the operation of the motor possible again.

The proposed DC electric motor has a higher holding torque due to the asymmetry means. The holding torque can be adjusted via the asymmetry means so that the holding torque is sufficiently large to support the weight of a tailgate of a motor vehicle in an open state, in particular in any fully or partially open state.

The increased holding torque eliminates the need for any holding, locking or braking elements, which simplifies the design of the electric motor for the tailgate and reduces its production costs.

In an embodiment, the asymmetry means is configured so that the holding torque can only hold the tailgate "just so", so that the user of the vehicle or tailgate or the motor itself requires only a small amount of force to initiate the movement of the tailgate and overcome the holding torque of the motor.

"Just so" means in particular that the holding torque of the motor is 10%, 5% or 2%, above the value that would be necessary to compensate for the weight force of the tailgate.

In an advantageous way, an excess of the holding torque prevents the tailgate from being set in motion unintentionally and causing damage to persons, the vehicle, or other objects.

In one embodiment, the asymmetry means comprises a physical manipulation of the rotor or a part thereof. In particular, the asymmetry means may comprise that the rotor or parts thereof are asymmetrically configured. For example, a recess may be machined into a pole piece of a rotor pole and/or a part of the pole piece may be undercut or cut off.

In a particular embodiment, the rotor comprises a plurality of pole pieces, some of which are asymmetrical to a mirror axis passing centrally through the respective rotor pole, different pole pieces being arranged on the rotor in the direction of rotation. Furthermore, different pole pieces can be arranged rotationally symmetrical to the axis of rotation, whereby a part of the pole pieces is itself asymmetrical to a mirror axis arranged centrally through the respective rotor pole.

In a further embodiment, the magnetic asymmetry means comprises a physical manipulation of the stator or a part thereof. For example, the stator comprises two or more magnets, which are in particular electromagnets. The magnets may each be different and in particular asymmetrically configured. Furthermore, different magnets may be rotationally symmetrically attached to the stator. The magnetic asymmetry means can be realized, for example, by a recess, undercut or other deformation of the magnets or the poles of the magnets.

The asymmetry means can further be realized by the width of an air gap between the rotor and the stator not being constant for the rotation of the rotor. For example, the air gap can be smaller in the first positions so that the magnetic interaction between the rotor and the stator is stronger in the first positions and forming the holding positions of the motor.

In a further embodiment, the asymmetry means comprises an eccentric bearing of the rotor.

The physical manipulation of the rotor, the stator or parts thereof can be realized in a simple and cost-effective manner. For example, after a uniform production of several identical parts or after the production of a rotationally symmetrical part, physical manipulations can be carried out in the form of reworking. The reworking may include, for example, cutting off, undercutting, grinding off, sawing off or other machining methods to physically manipulate the rotor, stator, or parts thereof. Such machining methods may also include, for example, drilling holes, including elongated holes, or introducing differently shaped cavities into the material of the rotor or of the stator.

In an embodiment, the rotor is composed of a plurality of metal sheets. The asymmetry means may comprise that not all sheets are formed identically, but different sheets are used. Further, for example, the metal sheets for a rotor may be formed into a shape that implements the asymmetry means prior to assembly.

In a further embodiment, the asymmetry means comprises an inhomogeneity of the material and the magnetic properties of the rotor or a part thereof. The inhomogeneity of the material may in particular be realized by different alloys within the rotor or parts thereof.

In an embodiment, iron is used as the material for the rotor or for the sheets of the rotor. For example, the rotor can be configured as a laminated rotor made of, in particular, stamped, iron sheets. In particular, the rotor may have a plurality of pole pieces, a part of the plurality of pole pieces being made of a different material or of a different alloy or of a different alloy composition than the rest of the rotor. For example, the rotor may have a core of pure iron with a portion of its pole pieces made of an iron-tin alloy containing, for example, 5% by weight of tin.

In an embodiment, the alloy material can be a material that has different magnetic properties than the base material. For example, the base material of the rotor can be iron, to which pole pieces made of iron and pole pieces made of an iron-aluminium alloy are attached. Aluminium as a non-magnetic material influences the magnetic interaction of the pole pieces in question with the stator. By using pole pieces made of iron and pole pieces made of an ironaluminium alloy, the pole pieces interact differently with the stator, whereby a higher holding torque is generated for the pole pieces that interact more magnetically than for the other pole pieces.

In a further embodiment, the asymmetry means comprises an inhomogeneity of the material or magnetic properties of the stator or parts thereof. For example, electromagnets may be formed with cores from different materials with different magnetic properties. In particular, one or more of the magnets may be formed from a different material or alloy than the other magnets of the stator.

The magnetic properties can be very precisely adjusted by the choice of material or its exact composition, so that the holding torque of the motor can be set precisely to a certain value.

In a further embodiment, the rotor and/or the stator comprises at least two pole pieces, wherein the asymmetry means is positioned in one or in a part of the pole pieces. In particular, the asymmetry means may comprise a physical manipulation and/or an inhomogeneity of the material of the pole pieces. For example, the motor may be a two-magnet motor with four, six or ten rotor poles or a four-magnet motor with four, six or ten rotor poles, with a pole piece extending from each rotor pole on one side or two sides in the direction of rotation. For example, a part of the pole pieces can be formed asymmetrically to an axis of symmetry of the respective rotor pole and/or comprise a differently magnetically interacting material than the other pole pieces.

The combination of a physical manipulation and an appropriate choice of materials or alloys can further specify the setting of the desired magnetic interaction.

In a further embodiment, the DC electric motor comprises at least two magnets, in particular two electromagnets, the asymmetry means being implemented by an asymmetrical switching of at least one of the magnets.

For example, one or more of the magnets of the stator and/or rotor can be controlled differently than the others, so that a different magnetic field is generated by this magnet or these magnets, which in turn influences the holding torque of the motor. In particular, the differently driven magnet(s) can be driven with a phase-shifted current or driven with a different current intensity.

In an advantageous way, the asymmetrical switching of the magnets or of the magnet allows an electric motor to be operated with a higher holding torque without requiring any structural modification.

In an embodiment, the DC electric motor is a four-magnet motor with six rotor poles. Each of the rotor poles has a pole piece which extends out of the rotor pole on one or both sides in the circumferential direction at the radial end of the respective rotor pole. In this embodiment, the asymmetry means are configured as a mechanical manipulation, in particular as an asymmetrical beveling, of a part of the pole pieces. The rotor including the rotor poles and the pole pieces can be rotationally symmetrical.

In a further embodiment, some or all of the foregoing forms of asymmetry means may be combined with each other in a DC electric motor as desired to adapt the holding torque of the motor to the requirements of the vehicle or the tailgate of the vehicle. For example, both the stator and the rotor may be provided with asymmetry means formed as a physical manipulation of the stator, the rotor and/or parts thereof, respectively. Furthermore, the stator and/or the rotor may be made of inhomogeneous materials or alloys, so that the asymmetry means—in addition to the physical manipulation—is formed by different materials with different magnetic properties. Finally, the asymmetry means may additionally comprise an asymmetric switching of the magnets.

In a further aspect, embodiments of the invention relate to a use of the above-described DC electric motor as a drive motor, in particular of a spindle drive, for a tailgate of a motor vehicle, in particular of a passenger car, wherein the DC electric motor and the asymmetry means are configured in such a way, that the holding torque of the direct-current electric motor is greater than or equal to the, in particular maximum, torque which the tailgate generates by its own weight on the drive and in particular on the rotor, in order to prevent a lowering of the tailgate caused by the own weight of the tailgate.

The use of the DC electric motor according to embodiments of the invention can save on locking, holding or braking components of the drive, since the motor can hold the tailgate in an open state, in particular in any fully or partially open state, by its own holding torque.

BRIEF DESCRIPTION

Some of the embodiments will be described in detail, with references to the following Figures, wherein like designations denote like members, wherein.

DETAILED DESCRIPTION

Figure 1A:
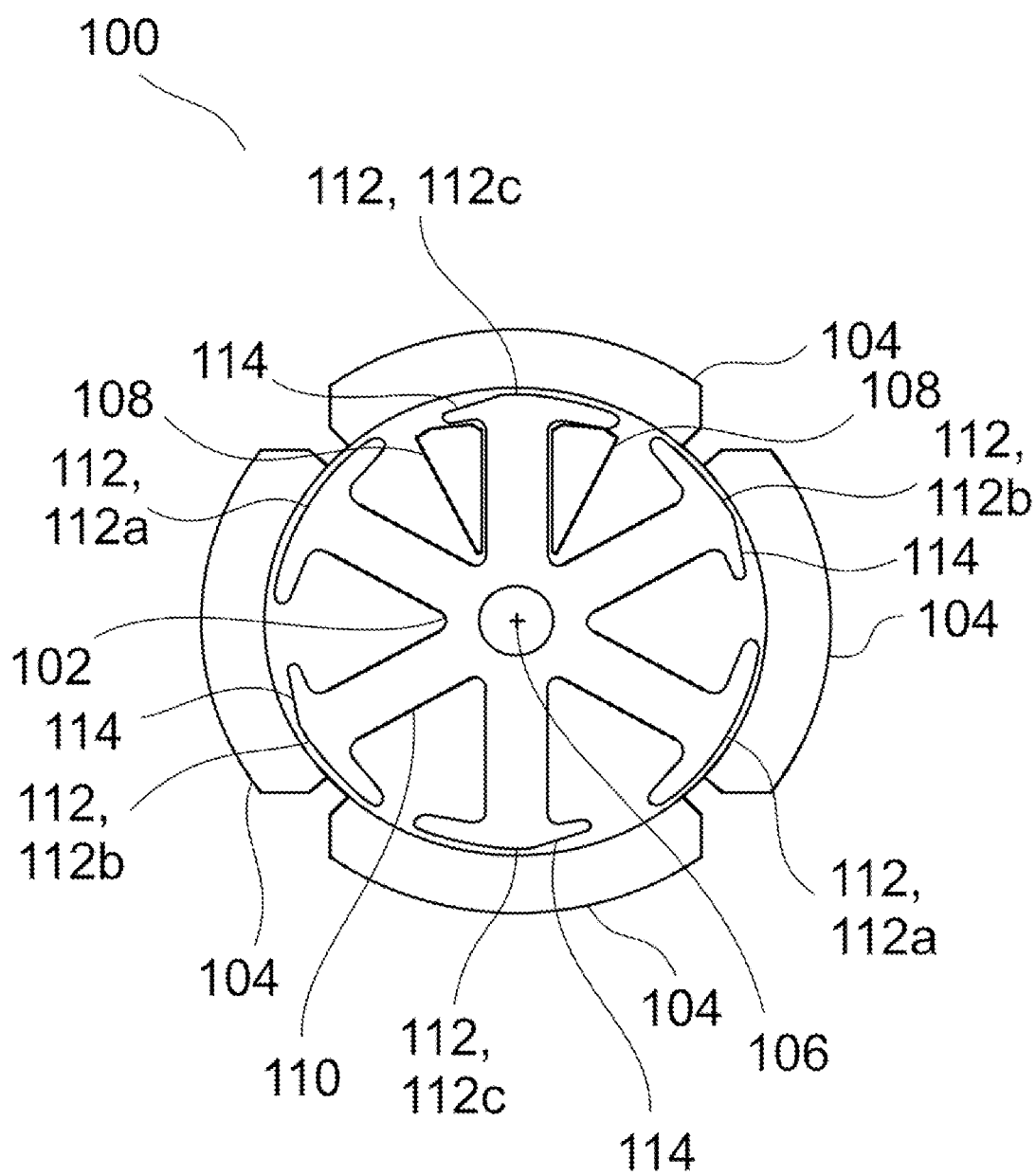
FIG. 1A shows a schematic representation of an exemplary embodiment of a DC electric motor.
Figure 4:
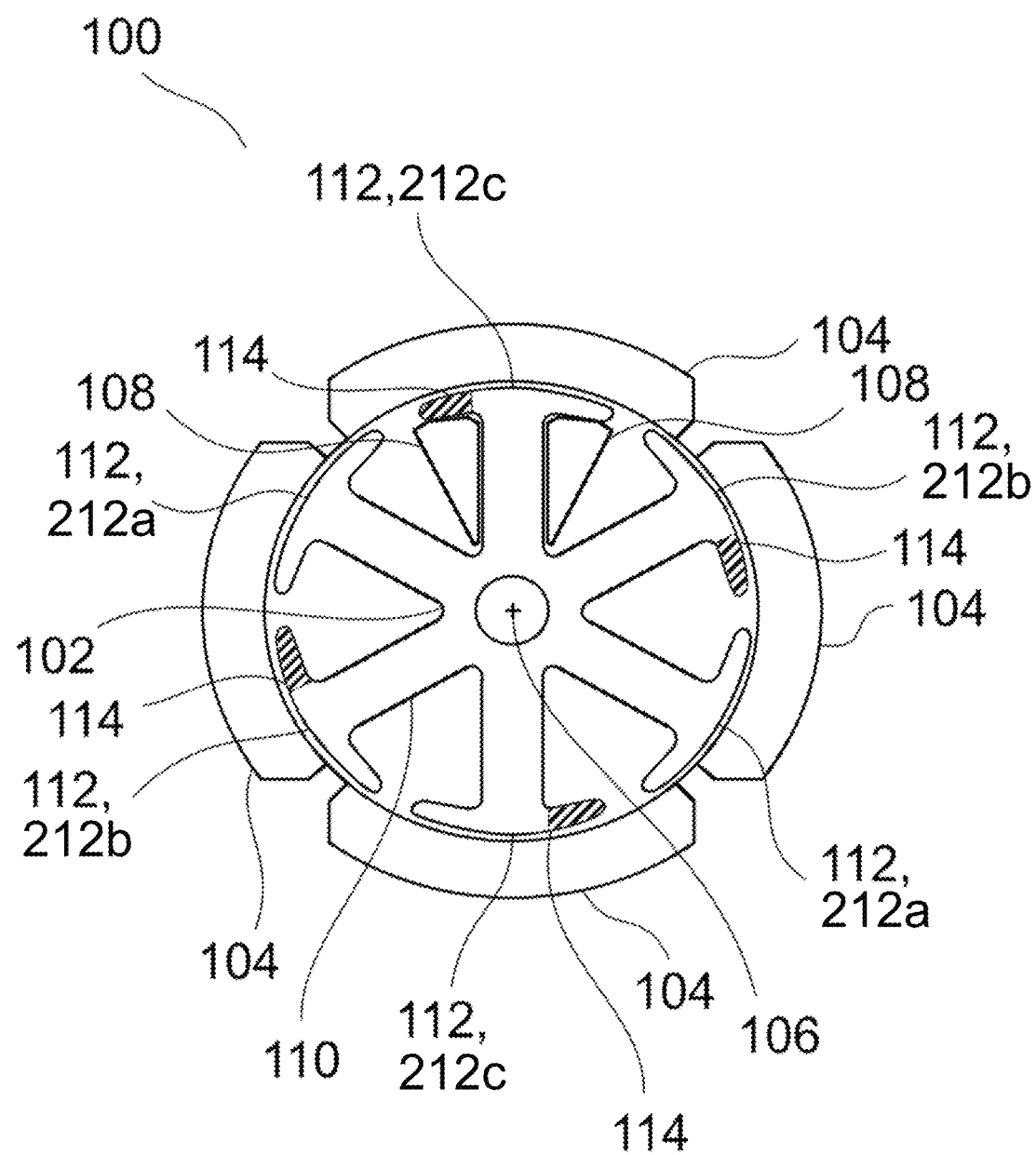
FIG. 4 shows a schematic representation of another exemplary embodiment of a DC electric motor.
Figure 5:
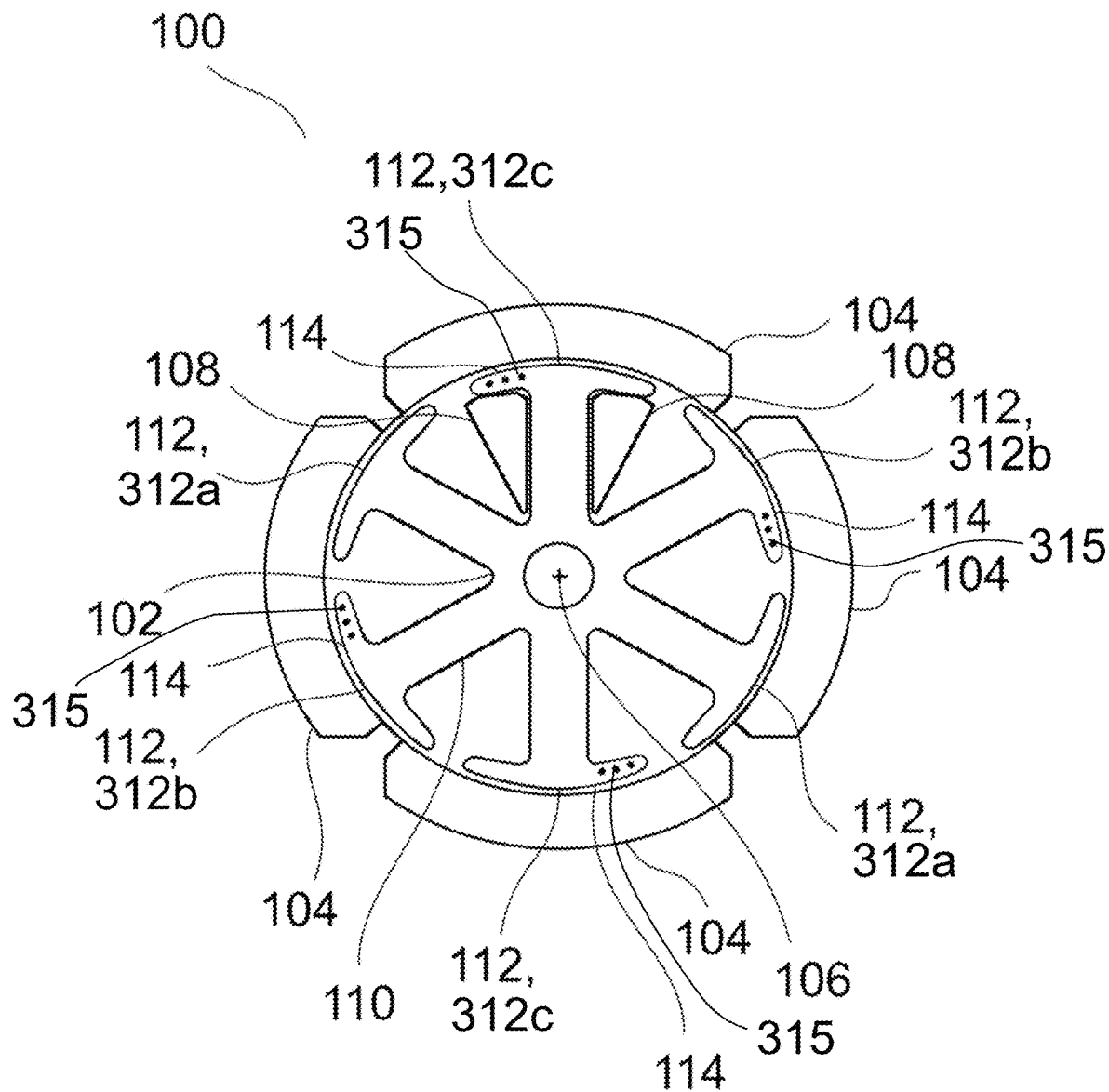
FIG. 5 shows a schematic representation of another exemplary embodiment of a DC electric motor.

FIGS. 1A, 4 and 5 show a schematic representations of a DC electric motor 100, which is a four magnet motor with six rotor poles 110. The DC electric motor comprises a rotor 102 and a stator, which in this representation comprises the magnets 104. The rotor 102 is mounted for rotation relative to the stator about the axis of rotation 106.

Furthermore, the illustrated DC electric motor 100 is equipped with additional auxiliary magnets 108 which improve the running characteristics of the motor.

The rotor 102 is rotationally symmetrical about the axis of rotation 106. A pole piece 112 is positioned at each radial end of the rotor poles 110 and extends circumferentially out of the respective rotor pole 110 in both directions.

Four of the six rotor poles 110 are equipped with a pole piece 112 which has an asymmetry means 114. Two of the pole pieces 112 each have the same design, so that three types of pole pieces 112 are installed in the illustrated DC electric motor 100. The first type comprises pole pieces 112a, 212a, 312a which have no asymmetry means 114. The first type of pole pieces 112a, 212a. 312a is symmetrical about a mirror axis extending radially from the axis of rotation 106 through the respective rotor pole. The second type comprises pole pieces 112b, 212b, 3126 having an asymmetry means 114 formed on one side in the circumferential direction. The third type comprises pole pieces 112c, 212c. 312e having an asymmetry means 114 formed on one side in the circumferential direction but located on the circumferentially opposite side of the rotor pole 110 than the asymmetry means 114 of the pole pieces 112b, 212b, 312b.

In the embodiment shown in FIG. 1A, the asymmetry means 114 are configured as a one-sided shortening of the pole pieces 112b, 112c. Furthermore, the side of the pole pieces 112b, 112c facing the stator is bevelled by the asymmetry means 114. In principle, other asymmetry means are also conceivable, which are not shown in FIG. 1A. For example, in the embodiment show in FIG. 4, the pole pieces 212b, 212c are made of different materials or alloys (indicated by hatching) than the pole pieces 212a. Further, in the embodiment shown in FIG. 5, the pole pieces 312b, 312c have holes or cavities 315 that affect the magnetic properties of the pole pieces 312b, 312c. In another embodiment, the rotor poles could be of different lengths such that the air gap between the pole pieces 112b, 112c and the magnets 104 is smaller or larger than the air gap between the pole pieces 112a and the magnets 104.

Due to the asymmetry means 114, for example due to the reduced extension of the pole pieces 112b, 112c and the widened air gap located at the position of the asymmetry means 114 between the pole pieces 112b, 112c and the magnets 104 in the embodiment shown in FIG. 1A, the magnetic flux between the rotor and the respective magnets 104 is reduced at the pole pieces 112b, 212b, 312b, 112c. 212c. 312c with the asymmetry means 114. The rotor 102 will therefore prefer a position at rest in which the magnetic flux of the magnets 104 through the rotor 102 is at a maximum. The strong magnetic flux through the pole pieces 112a, 212a. 312a creates a holding torque that holds the rotor 102 in one of these positions. These positions are the positions previously referred to as the first positions.

Figure 1B:
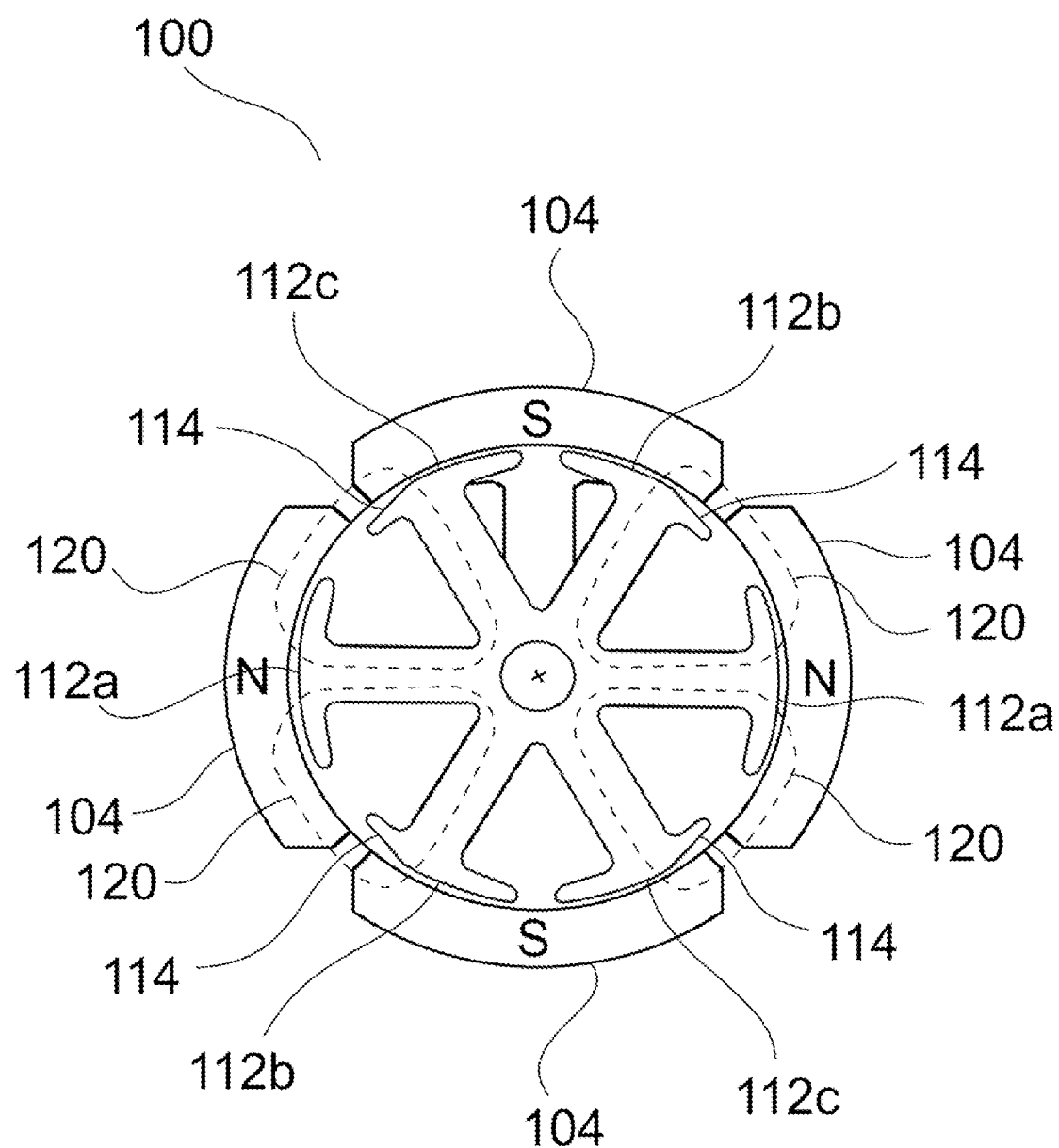
FIG. 1B shows the DC electric motor from FIG. 1, which has assumed one of the first positions.

FIG. 1B shows the DC electric motor 100 of FIG. 1A which has moved to one of the first positions. In the illustration, the poles of the lateral magnets 104 are shown as north poles and the poles of the top and bottom magnets 104 are shown as south poles. The configuration of the magnets 104 is exemplary and could be the other way around. It is merely for the purpose of understanding embodiments of the invention.

In the position shown in FIG. 1B, the rotor 102 is oriented so that the magnetic flux 120 through the rotor 102 is at a maximum. The first type of pole pieces 112a are located centrally in front of the lateral magnets 104. The second type pole pieces 112b and the third type pole pieces 112c are located in front of the upper and lower magnets 104, with the asymmetry means 114 facing the north pole magnets 104. In this configuration, the asymmetry means 114 act as a focus for the magnetic field lines 120 that pass through the rotor poles towards the south poles. The asymmetry means 114 increase the distance between the pole pieces 112a, 112b and the north pole magnets 104 so that the magnetic flux from the north poles via the asymmetry means 114 is less than the magnetic flux from the rotor poles 110 to the south pole magnets 104.

Without the asymmetry means 114, the magnetic flux, represented by the field lines 120, would be able to change from one rotor pole to the other much more easily, i.e., without much force, which would make the motor run more smoothly. The curve of the holding torque of such a motor without asymmetry means is shown in FIG. 2.

Due to the four magnet 104 configuration, a DC electric motor 100 of FIGS. 1A and 1B has four equivalent first positions in which the pole pieces 112a face one of the magnets 104. In embodiments with two magnets 104 there would be two first positions, in embodiments with six magnets 104 there would be six first positions, and so on. The number of first positions in this and similar configurations is therefore equal to the number of magnets 104.

Figure 2:
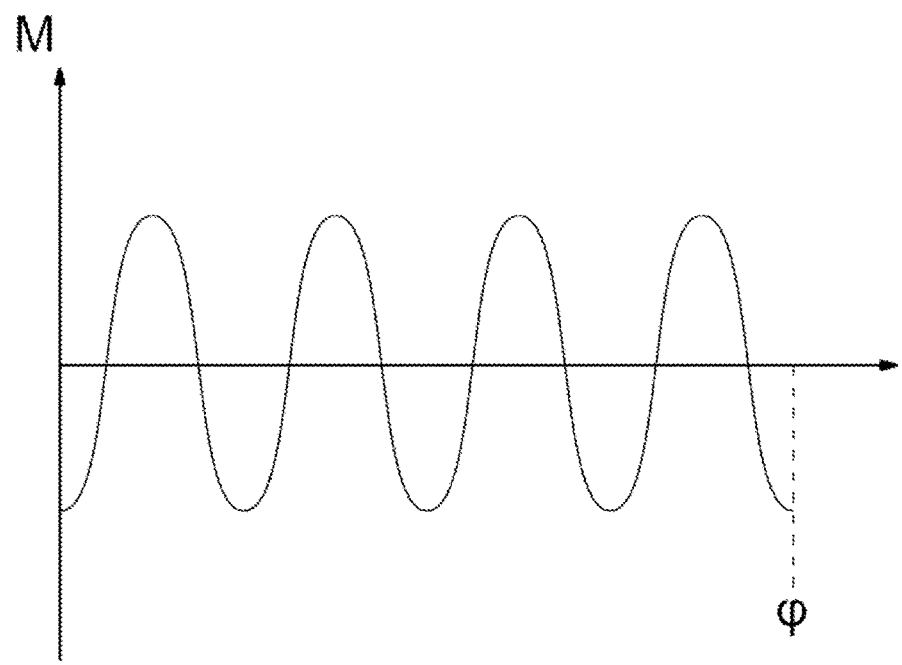
FIG. 2 shows the variation of the holding torque depending on the angle of rotation for a DC electric motor without asymmetry means.

FIG. 2 shows the variation of the holding torque M of a DC electric motor 100 with four magnets 104 without asymmetry means 114 dependent on the phase φ. The curve describes a uniform sine or cosine curve. Shown here is a sine curve shifted by −90° over the entire phase φ, i.e., one full revolution or 360° of the rotor 102. The four magnets 104 result in four maxima and minima each. The flanks of the points at which the holding torque is particularly high are even and steady, which would result in the smooth operation of a corresponding motor. The rotor 102 of such a motor would be able to easily change from one position to the next, which is normally desired as this realizes low power losses and low noise during operation of the motor.

Figure 3:
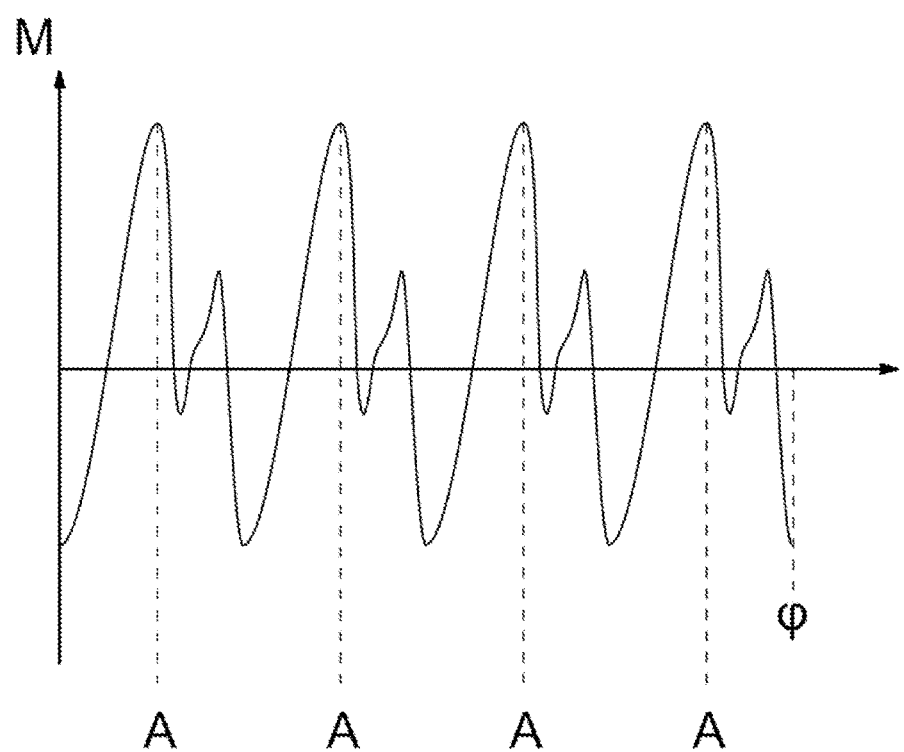
FIG. 3 shows the variation of the holding torque depending on the angle of rotation for a DC electric motor according to FIG. 1A and FIG. 1B.

FIG. 3 shows the variation of the holding torque M dependent on the phase q of the DC electric motor 100 from FIGS. 1A and 1B. The asymmetry means 114 distorts the curve of the holding torque from a sine or cosine curve to another periodic function. The four first positions A, which can be assigned to the four magnets 104, are the points with the highest holding torque M.

The slopes of the holding torque curve around the first positions A are steeper compared to the curve shown in FIG. 2, and the amplitude of the holding torque M is higher. The curve between two first positions A results from the particular design of the asymmetry means 114 from FIGS. 1A and 1B. With other or differently configured asymmetry means 114, the curve of the holding torque M would be configured accordingly.

For a use according to embodiments of the invention of the DC electric motor 100, the holding torque M in one of the first positions A should be at least as great, or greater, than the torque, in particular the maximum torque, which the tailgate of a motor vehicle exerts on the drive by its own weight.

Although the invention has been illustrated and described in greater detail with reference to the exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE SIGNS

100 DC electric motor
102 Rotor
104 Magnet
106 Axis of rotation
108 Auxiliary magnet
110 Rotor pole
112 Pole piece
112a, 212a, 312a Pole piece (first type)
112b, 212b, 312b Pole piece (second type)
112c, 212c, 312c Pole piece (third type)
114 Asymmetry means
120 Magnetic field line
315 Hole or cavity
φ Phase
M Holding torque
A First position

The invention claimed is:

1. A use of a DC electric motor as a drive for driving a tailgate of a vehicle, the DC electric motor comprising a rotor and a stator, the rotor being mounted for rotation relative to the stator about an axis of rotation,
wherein the rotor comprises a magnetic asymmetry means for generating an asymmetric magnetic interaction between the rotor and the stator,
wherein the rotor and the stator are configured to assume first positions and second positions relative to each other, wherein a higher holding torque acts between the rotor and the stator in one of the first positions than in one of the second positions due to the magnetic asymmetry means,
wherein the rotor comprises a plurality of rotor poles,
wherein the rotor comprises a plurality of pole pieces extending from each of the plurality of rotor poles on one side or on two sides in a direction of rotation of the rotor, and
wherein the magnetic asymmetry means is embodied by at least one of the plurality of pole pieces being shaped asymmetrically to an axis of symmetry of the rotor pole carrying the at least one pole piece,
the DC electric motor and the magnetic asymmetry means being designed in such a way that the holding torque of the DC electric motor is greater than or equal to the torque which the tailgate generates by its own weight on the drive.

2. The use of the DC electric motor according to claim 1, wherein the magnetic asymmetry means comprises a one-sided shortening of the at least one pole piece.

3. The use of the DC electric motor according to claim 1, wherein the holding torque of the DC electric motor is greater than or equal to the torque which the tailgate generates by its own weight on the rotor.

4. A use of a DC electric motor as a drive for driving a tailgate of a vehicle, the DC electric motor comprising:
   a rotor and a stator, the rotor being mounted for rotation relative to the stator about an axis of rotation,
   wherein the rotor comprises a magnetic asymmetry means for generating an asymmetric magnetic interaction between the rotor and the stator,
   wherein the rotor and the stator are adapted to assume first positions and second positions relative to each other, wherein a higher holding torque acts between the rotor and the stator in one of the first positions than in one of the second positions due to the asymmetry means,
   wherein the rotor comprises a plurality of rotor poles,
   wherein the rotor comprises a plurality of pole pieces extending from each of the plurality of rotor poles on one side or on two sides in a direction of rotation of the rotor, and
   wherein the magnetic asymmetry means is embodied by at least one of the plurality of pole pieces comprising a different material than the other pole pieces,
   the DC electric motor and the magnetic asymmetry means being designed in such a way that the holding torque of the DC electric motor is greater than or equal to the torque which the tailgate generates by its own weight on the drive.

5. The use of the DC electric motor according to claim 4, wherein the holding torque of the DC electric motor is greater than or equal to the torque which the tailgate generates by its own weight on the rotor.

6. A use of a DC electric motor as a drive for driving a tailgate of a vehicle, the DC electric motor comprising:
   a rotor and a stator, the rotor being mounted for rotation relative to the stator about an axis of rotation,
   wherein the rotor comprises a magnetic asymmetry means for generating an asymmetric magnetic interaction between the rotor and the stator,
   wherein the rotor and the stator are adapted to assume first positions and second positions relative to each other, wherein a higher holding torque acts between the rotor and the stator in one of the first positions than in one of the second positions due to the asymmetry means,
   wherein the rotor comprises a plurality of rotor poles,
   wherein the rotor comprises a plurality of pole pieces extending from each of the plurality of rotor poles on one side or on two sides in a direction of rotation of the rotor, and
   wherein the magnetic asymmetry means is embodied by at least one of the plurality of pole pieces having holes or cavities that affect the magnetic properties of the at least one of the plurality of pole pieces,
   the DC electric motor and the magnetic asymmetry means being designed in such a way that the holding torque of the DC electric motor is greater than or equal to the torque which the tailgate generates by its own weight on the drive.

7. The use of the DC electric motor according to claim 6, wherein the holding torque of the DC electric motor is greater than or equal to the torque which the tailgate generates by its own weight on the rotor.

* * * * *